United States Patent [19]

Takeuchi et al.

[11] Patent Number: 4,653,471
[45] Date of Patent: Mar. 31, 1987

[54] SOLAR HEAT COLLECTOR

[75] Inventors: Hirosato Takeuchi; Toshio Mikiya, both of Tokyo, Japan

[73] Assignee: Nitto Kohki Co., Ltd., Tokyo, Japan

[21] Appl. No.: 801,399

[22] Filed: Nov. 25, 1985

Related U.S. Application Data

[63] Continuation of Ser. No. 520,210, Aug. 4, 1983, abandoned.

[30] Foreign Application Priority Data

Aug. 4, 1982 [JP] Japan ............................ 57-117811[U]

[51] Int. Cl.$^4$ ................................................ F24J 2/32
[52] U.S. Cl. .................................... 126/433; 126/443; 126/446; 165/104.26
[58] Field of Search ................ 126/433, 443, 446; 165/104.26, 48.2

[56] References Cited

U.S. PATENT DOCUMENTS

| 4,119,085 | 10/1978 | Knowles | 126/443 |
| 4,217,882 | 8/1980 | Feldman | 126/433 |
| 4,259,946 | 4/1981 | Roehm | 126/443 |
| 4,377,155 | 3/1983 | Tonomura et al. | 126/446 |

FOREIGN PATENT DOCUMENTS

| 0134248 | 10/1980 | Japan | 126/433 |
| 0085652 | 7/1981 | Japan | 126/433 |
| 0130954 | 8/1983 | Japan | 126/446 |

Primary Examiner—Kenneth J. Dorner
Assistant Examiner—Gerald A. Anderson
Attorney, Agent, or Firm—Birch, Stewart, Kolasch & Birch

[57] ABSTRACT

A heat pipe for a solar heat collector in which a header pipe is brought into fixed surface contact with a heat-radiation portion of the heat pipe formed of a heat-conductive material. A plurality of ribs are formed of the same material as the heat pipe and extend radially from a heat-collection portion of the heat pipe. A heat-conductive plate is provided contiguous to the ends of the ribs as a unitary piece. The heat-conductive plate may be positioned in surface contact with the rear side of the heat-collecting face of a solar heat collector pipe.

6 Claims, 8 Drawing Figures

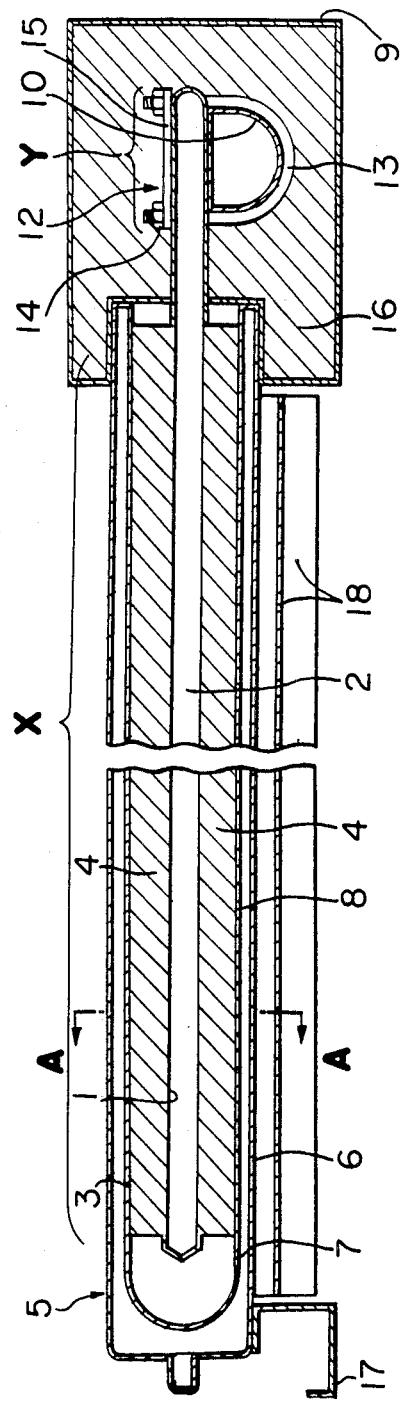
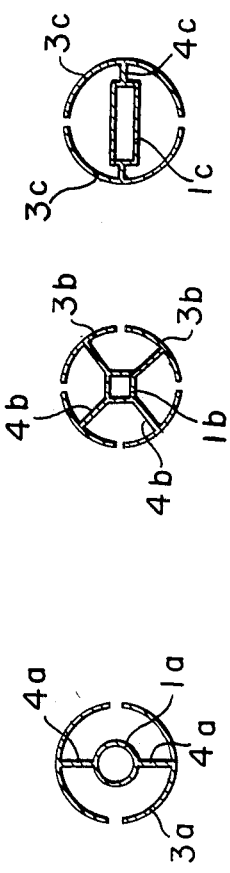
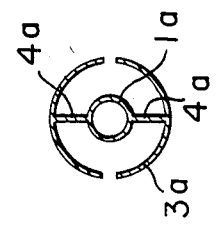
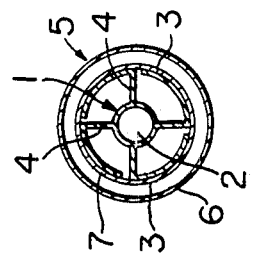

SOLAR HEAT COLLECTOR

This application is a continuation of application Ser. No. 520,210, filed on Aug. 4, 1983, now abandoned.

BACKGROUND OF THE INVENTION

1. Field of the Invention

The present invention relates to a solar heat collector for improving the collection and heat conduction of solar heat, thereby making more effective use of solar heat.

2. Description of Background Art

A solar heat collector pipe is known which comprises an evacuated double-tubing glass pipe through which a heat pipe is inserted. The heat pipe is fitted into a groove in a heat-conductive plate. However, with the aforesaid solar heat collector pipe, some difficulty is involved in bringing the heat pipe into uniform surface contact with the groove in the heat-conductive plate. For that reason, heat conduction between both parts is so poor that the solar heat collected is not effectively used due to heat loss.

SUMMARY AND OBJECTS OF THE INVENTION

The present invention resolves the problems discussed above regarding the prior art. Improved heat conduction is obtained by forming a heat pipe and an associated heat-conductive plate as a unitary piece. The heat-radiating portion of the heat pipe is brought into surface contact with the outer face of a header pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a longitudinally sectioned view showing a first embodiment of the solar heat collector pipe of the evacuated double-tubing type according to the invention, wherein one embodiment of a heat pipe is used;

FIG. 2 is a longitudinally sectioned front view taken along the line A—A of FIG. 1;

FIGS. 3 to 5 are longitudinally sectioned front views showing three embodiments of the heat pipe, which are different from one another in cross-sectional shape;

DETAILED DESCRIPTION OF THE INVENTION

Figure 6:
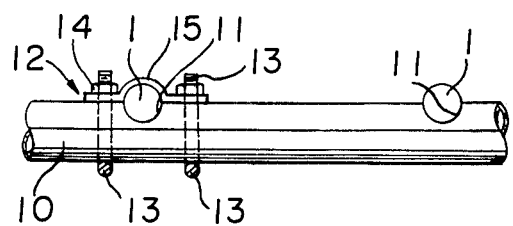
FIG. 6 is a front view showing the header pipe to which is attached a heat-radiating portion of the first embodiment of the heat pipe being of a circular shape in cross section.

Referring to FIGS. 1 and 2, a heat pipe 1 is formed by extrusion or drawing from a material which is inexpensive and has a high heat conductivity, such as aluminium. The heat pipe 1 is closed at both of its ends, and hermetically contains a heat medium 2 in a low pressure state. Water, ammonia or suitable liquids such as an alcohol or oil having a low boiling point may be used as the heat medium 2.

A thin heat-conductive plate 3 is formed as a unitary piece with the heat pipe 1 by extrusion or drawing (hereinafter referred to as the extrusion). A plurality of ribs 4 are radially provided on the outer periphery of the heat pipe 1. In the embodiment illustrated, four ribs 4 are formed axially outwardly from the heat pipe 1. The ribs 4 are simultaneously formed of the same material with the heat pipe 1 and the heat-conductive plate 3. Thus, the heat-conductive plate 3 may be positioned in uniform contact with the inner periphery of an evacuated double-tubing type heat collector pipe 5 (hereinafter referred to as the collector pipe).

In FIG. 3, two heat-conductive plates 3a are symmetrically spaced from the outer periphery of a heat pipe 1a, which is of a circular shape in cross section, through two ribs 4a extending therefrom.

In FIG. 4, four heat-conductive plates 3b are diametrically, symmetrically spaced from the outer periphery of a heat pipe 1b, which is of a rectangular shape in cross section, through four ribs 4b extending radially therefrom.

In FIG. 5, two semicircular heat-conductive plates 3c are spaced from the outer periphery of a heat pipe 1c which is of rectangular shape in cross section, through two ribs 4c extending from the short sides thereof.

It should be noted that the collector pipe 5 used in the embodiment illustrated includes an outer tube 6 and an inner tube 7 having a selective absorption film 8 applied over the outer surface. A space provided between the outer and inner tubes 6, 7 is evacuated to a high degree of vacuum. Over the heat-collecting portion X of the heat pipe 1, for evaporation, the heat-conductive plate 3 is uniformly brought into close contact with the inner periphery of the inner tube 7. The heat-radiating portion Y of the heat pipe 1, for condensation, is brought into fixed surface contact with the upper face of a header pipe 10 housed within a casing 9.

Figure 7:
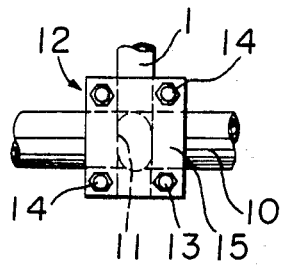
FIG. 7 is a plan view of FIG. 6.
Figure 8:
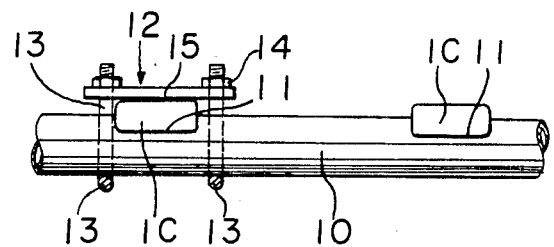
FIG. 8 is a front view showing the header pipe to which is attached the heat-radiating portion of the heat pipe being of a rectangular shape in cross section.

FIGS. 6 to 8 illustrate a coupling for fixing the heat pipe 1 to the header pipe 10. A pipe-supporting portion 11 is formed on the upper face of the header pipe 10, and is recessed in a semicircular form corresponding to the curved section of the heat pipe 1. The heat pipe 1 is placed at the heat-radiating portion Y on the pipe-supporting portion 11, and is detachably fixed to the header pipe 10 by fittings 12. The fittings 12 comprise two U-shaped members 13 fitted over the header pipe 10 and fixed thereto through a keeper plate 15 by means of bolts 14 threaded onto the ends of the members 13. FIG. 8 illustrates one embodiment wherein the heat pipe 1c of FIG. 5 is applied to the header pipe 10.

A heat-insulating material 16 is provided within the casing 9. A frame 17 supports the tailing side of the collector pipe 5. In addition, a reflector 18 is mounted adjacent to a lower surface of the collector pipe 5.

The foregoing embodiment operates as follows. The selective absorption film 8 absorbs about 90% of the solar heat radiated onto the collector pipe 5 either directly, or indirectly, through the reflector 18. The absorbed heat is efficiently conducted to the thin heat-conductive plate 3, so that the heat-collecting portion X of the heat pipe 2 is heated through the heat-conductive plate 3 and the ribs 4. When heat is applied to the heat-collecting portion X, the heat medium within the heat pipe 1 evaporates at a relatively low temperature, e.g., 50° C., since the interior of the heat pipe 2 is maintained at a lower pressure. The resulting vapors move toward the heat-radiating portion Y (for condensation), where the heat thereof is transmitted to the heat absorption header pipe 10, so that the liquid therein is heated. When heat radiation takes place at the heat-radiating portion Y, the vapors within the heat pipe 1 condense in the vicinity of Y.

In this manner, the heat pipe 1 efficiently transmits solar heat to the liquid stored in the header pipe 10 by repeated heat collection (evaporation) and heat radiation (condensation).

The heat pipe 1 is detachably fixed at the heat-radiating portion to the header pipe 10. Thus, in case the collector pipe 5 or the heat pipe 1 fails, it can be replaced by a new one without interrupting the function of the system.

As mentioned above, the present invention provides a solar heat collector in which a header pipe is brought into fixed surface contact with the heat-radiation portion of a heat pipe formed of a heat-conductive material. A plurality of ribs are formed of the same material as the heat pipe and extend radially from the heat-collection portion of the heat pipe. A heat-conductive plate is provided contiguous to the ends of the ribs as a unitary piece. The heat-conductive plate is brought into surface contact with the rear side of the heat-collecting face of a solar heat collector pipe. According to the present invention, the heat-conductive plate is united to the heat pipe, and the heat-radiating portion of the heat pipe is brought into fixed surface contact with the header pipe. Consequently, the solar heat collected can efficiently be transmitted to the header pipe with considerably reduced heat losses.

In addition, the solar heat collector according to the present invention involves a markedly reduced number of steps, compared with the prior art collector, whereby the time period of assembling can be reduced with reductions in the cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solar heat collector comprising:
    an evacuated double-tubing type solar heat collector pipe having a cylindrical inner pipe and a cylindrical outer pipe;
    a header pipe including a continuous outer surface having a supporting portion for a heat pipe being disposed on said outer surface thereof;
    a heat pipe formed of a heat-conductive material having a first end portion connected in surface contact with said supporting portion of said header pipe and a second end portion operatively positioned concentrically within the inner pipe of said solar heat collection pipe;
    at least two ribs connected at inner ends with the outer wall of said heat pipe and extending symmetrically radially outwardly from said heat pipe toward said inner pipe of said solar heat collector pipe;
    at least two arcuate heat-conductive plates separate and circumferentially spaced apart from each other and in surface contact with said inner surface of the inner pipe of said solar heat collector pipe, each of said plates being connected with the outer end of the corresponding one of said ribs;
    said heat pipe, said ribs and said plates being formed of the same material and as one integral piece; and
    a thermal insulating material enclosing said header pipe and the first end portion of said heat pipe connected with the header pipe;
    said supporting portion of said header pipe being recessed in a form coresponding to said heat pipe for receiving said heat pipe therein.

2. A solar heat collector according to claim 1 having means for detachably securing said heat pipe to said supporting portion of said header pipe including U-shaped members fitted over said header pipe, and a keeper pipe fixed to said members.

3. A solar heat collector according to claim 1, wherein said heat pipe is circular in cross section and includes four ribs projecting radially outwardly therefrom and four heat-conductive plates each being formed integrally on end portions of each of said four ribs.

4. A solar heat collector according to claim 1, wherein said heat pipe is circular in cross section and includes two ribs projecting radially outwardly therefrom and two heat-conductive plates each being formed integrally on end portions of each of said two ribs.

5. A solar heat collector according to claim 1, wherein said heat pipe is rectangularly shaped in cross section and includes four ribs projecting outwardly from corner portions of said rectangle and four heat-conductive plates each being formed integrally on end portions of each of said four ribs.

6. A solar heat collector according to claim 1, wherein said heat pipe is rectangularly shaped in cross section and includes two ribs projecting outwardly from short sides of said rectangle and two heat-conductive plates each being formed integrally on end portions of each of said two ribs.

* * * * *